US009683697B2

(12) United States Patent
Conley et al.

(10) Patent No.: US 9,683,697 B2
(45) Date of Patent: Jun. 20, 2017

(54) SYSTEM AND METHOD OF CONFIRMING LUBRICATION TO BEARING

(71) Applicant: Lincoln Industrial Corporation, St. Louis, MO (US)

(72) Inventors: Paul G. Conley, St. Charles, MO (US); Nathan David Donovan, Columbia, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 135 days.

(21) Appl. No.: 14/675,209

(22) Filed: Mar. 31, 2015

(65) Prior Publication Data
US 2016/0290848 A1 Oct. 6, 2016

(51) Int. Cl.
| F16N 27/00 | (2006.01) |
| F16N 31/00 | (2006.01) |
| F16N 29/00 | (2006.01) |
| F16N 7/38 | (2006.01) |
| G01F 15/00 | (2006.01) |
| F16N 13/16 | (2006.01) |

(52) U.S. Cl.
CPC ............. *F16N 31/00* (2013.01); *F16N 7/385* (2013.01); *F16N 29/00* (2013.01); *F16N 13/16* (2013.01); *F16N 2250/06* (2013.01); *G01F 15/008* (2013.01)

(58) Field of Classification Search
CPC . G01F 1/00; G01F 3/00; G01F 15/008; F16N 7/14; F16N 7/38; F16N 13/22; F16N 99/00; F16N 2250/42; F16N 2260/08; F16N 2270/20; F16N 2280/00; F16N 2280/04; F16N 31/00
USPC ........................ 73/198; 184/6.1, 7.4, 26, 108
See application file for complete search history.

(56) References Cited

U.S. PATENT DOCUMENTS

| 5,307,288 A | * | 4/1994 | Haines | .................. | F04B 49/065 |
| | | | | | 415/144 |
| 2012/0132483 A1 | * | 5/2012 | Conley | ..................... | F16N 7/14 |
| | | | | | 184/6.4 |
| 2013/0168188 A1 | * | 7/2013 | Donovan | .................. | F16N 7/14 |
| | | | | | 184/6 |
| 2013/0277148 A1 | * | 10/2013 | Beck | ....................... | F16N 29/02 |
| | | | | | 184/6.4 |

* cited by examiner

*Primary Examiner* — Benjamin Schmitt
(74) *Attorney, Agent, or Firm* — Senniger Powers LLP (57) ABSTRACT

Methods and systems for determining lubrication flow dispensed to lubrication points. Lubricant delivery is determined based upon the difference between volume measurements detected as the lubricant is delivered to the lubrication points, and volume measurements detected as the lubricant is vented after delivery. A flow sensor in the lubricant supply line measures lubricant delivered and lubricant vented and a controller determines the amount dispensed based upon the difference between the delivered and vented measurements.

10 Claims, 4 Drawing Sheets

SYSTEM AND METHOD OF CONFIRMING LUBRICATION TO BEARING

BACKGROUND OF THE INVENTION

The present invention relates to systems and methods of confirming lubricant flow, and particularly to systems and methods for measuring the net flow of highly viscous lubricant to confirm sufficient lubricant flow to bearings.

Automatic lubrication systems are pressure activated systems that distribute lubricant. Examples known in the art include single line injector systems and dual line lubrication systems. Flow sensors are commonly used in presently available automatic lubrication systems to detect whether the lubrication system is functioning properly. The flow sensors are typically placed in lines that supply lubricant to the system. One indication that the system is functioning properly is the indication of adequate flow sensed by the flow sensors. Another common indication that the system is functioning properly is provided by measuring the pressure of the pump supplying lubricant to the system. Lubrication points, or bearings, are a critical component of an automatic lubrication system. Several factors prevent obtaining a useful analysis of whether the bearings are functioning properly, such as the temperature dependent properties of the lubricant, or the malfunctioning (e.g. jamming) of lubrication valves caused by contaminants in the lubricant flow. In these instances, a pressure measurement of the pump may fail to indicate a malfunctioning system.

Many current technologies related to lubrication system performance are deficient in that they are unable to reliably confirm whether the correct amount of lubrication actually reaches a lubrication point in an economical manner. Such current technologies are unable to detect whether lubricant actually reaches the lubrication point without placing a flow sensor directly at the inlet of each individual lubrication point, which is cost prohibitive. A need exists for an economical method of determining whether lubrication reaches a lubrication point, as well as a method for determining the amount of lubricant that reaches the lubrication point.

SUMMARY OF THE INVENTION

In one aspect, the present invention is a method for determining lubrication flow dispensed to a lubrication point, the method comprising providing a flow sensor within a supply line supplying lubricant from a lubricant supply to a lubrication point, the flow sensor being configured to measure lubricant flow within the supply line. The method further comprises transferring lubricant from the lubricant supply to the lubrication point via the supply line while detecting a first lubricant flow measurement, venting the supply line to release lubricant from a port between the flow sensor and the lubricant supply while detecting a second lubricant flow measurement, and determining the amount of lubricant dispensed to the lubrication point based upon the difference between the first lubricant flow measurement and the second lubricant flow measurement.

In another aspect, the present invention is a system for determining lubrication flow dispensed to a lubrication point, comprising a flow sensor in a supply line supplying lubricant from a lubricant supply to a lubrication point and configured to measure lubricant flow. The system further comprises a vent valve between the lubricant supply and the flow sensor and a controller connected to the flow sensor and the vent valve configured to collect a first flow measurement during supply of the lubrication to the lubrication point, to collect a second flow measurement in response to venting, and to determine the amount of lubricant dispensed to the lubrication point based upon the difference between the first lubricant flow measurement and the second lubricant flow measurement.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. Furthermore, the term "fluid" as used herein is intended to include both liquids and semi-solids capable of being transported through a passage, a channel, a tube or similar structure, and the term "flow" is intended to mean any such movement, conveyance or transportation of a "fluid". The terminology includes the words specifically mentioned above, derivatives thereof, and words of similar import.

Figure 1:
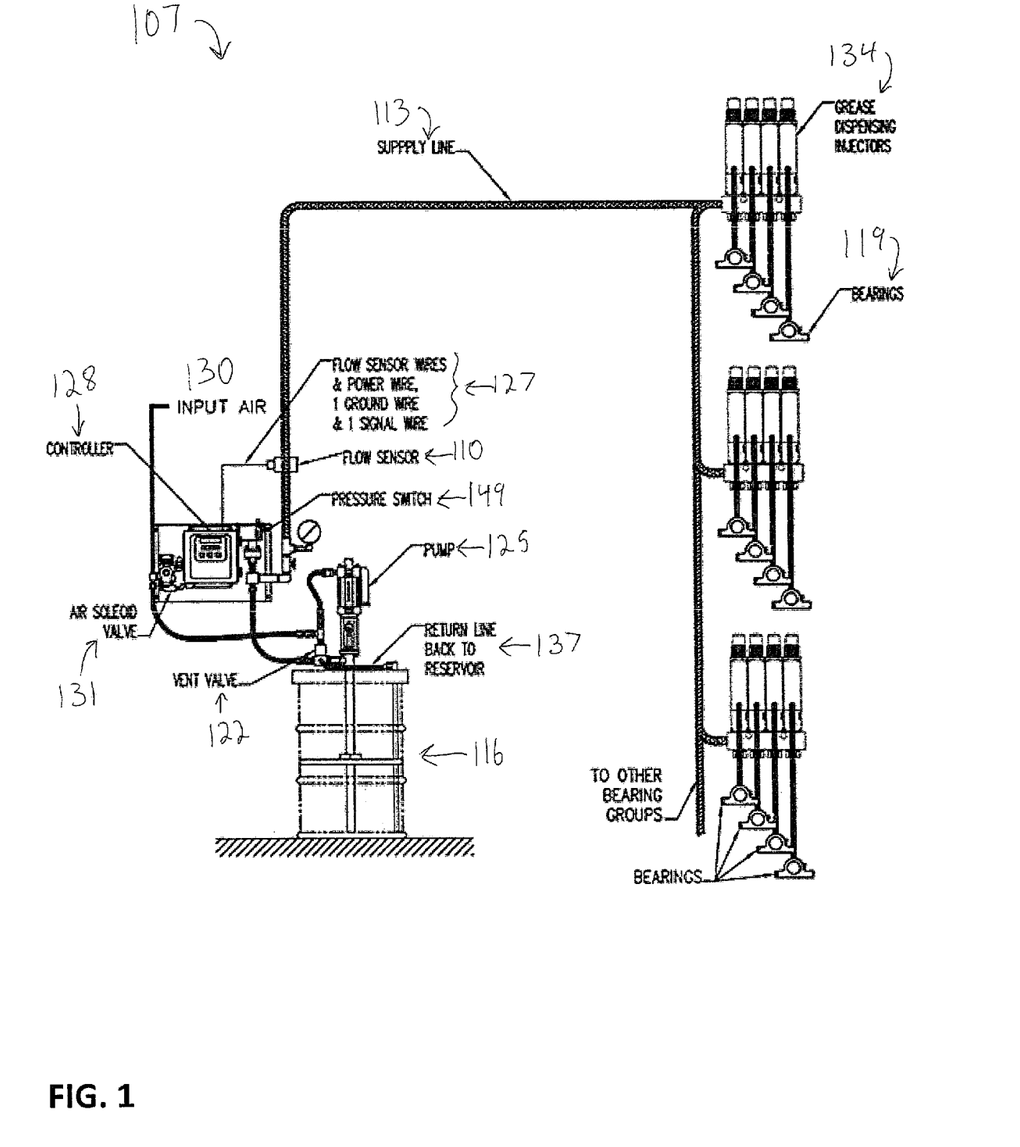
FIG. 1 depicts a perspective view of a net lubrication flow detector system and method for use in a single line lubrication system for determining lubrication flow dispensed to lubrication points in accordance with a first construction of the present invention.

Referring now to the drawings in detail, wherein like numbers are used to indicate like elements throughout, there is shown in FIGS. 1-4 systems and methods for measuring the net flow of highly viscous lubricant to confirm lubricant flow to lubrication points, such as bearings. FIG. 1 depicts a perspective view of a net lubrication flow detector system 107 for use in a single line lubrication system for determining lubrication flow dispensed to one or more bearings at lubrication points 119 in accordance with a first construction of the present invention. The net lubrication flow detector system 107 includes a flow sensor 110 within a supply line 113 supplying lubricant from a lubricant supply 116 to the lubrication points 119, the flow sensor 110 configured to measure the net lubricant flow within the supply line 113. The flow sensor 110 is capable of measuring net lubricant flow volume by measuring the net amount of lubricant flow volume to the lubrication points 119. The flow sensor 110 provides this capability by being configured to measure lubricant flow volume out to lubrication points 119 from the lubricant supply 116 via the supply line 113, and additionally to measure lubricant flow volume returning from the lubrication points 119 to the lubricant supply 116 via the supply line 113 when the supply line 113 is vented to the lubricant supply 116 by a vent valve 122 connected to the lubricant supply 116 via a return line 137. The flow sensor 110 is configured to measure lubricant flow in two directions, and therefore provides the capability of measuring net flow of lubricant by volume in order to determine an amount of lubricant dispensed to lubrication points 119 during each lubrication cycle. As will be described in further detail, because the flow sensor 110 measures net flow during each lubrication cycle, the system 107 has the capability of comparing the determined net flow to a reference amount to provide an indication of excessive or deficient lubricant flow to the lubrication points 119 during a lubrication cycle. For example, the flow sensor may a sensor as described in pending U.S. patent application Ser. No. 14/586,002 filed Dec. 30, 2014, the entire disclosure of which is incorporated herein by reference.

The lubrication points 119 comprise bearings connected to the lubrication system 107. The vent valve 122 located in the supply line 113 between the lubricant supply 116 and the flow sensor 110 is operated to release the pressure in the supply line 113, to allow the lubricant to vent from the supply line 113 to the lubricant supply 116 and to allow the flow sensor 110 to measure the volume of vented lubricant. The system 107 further includes a pump 125 configured to transfer pressurized lubricant from the lubricant supply 116 through the supply line 113 to the bearings. In an embodiment, the pump 125 is supplied with pressurized air after a controller 128 operates an air solenoid valve 131, as will be further described herein.

With further reference to FIG. 1, the controller 128 is connected to the flow sensor 110 via connecting wires 127 including wires as needed such as wires transmitting power to the flow sensor 110, wires connecting the flow sensor 110 to a ground, and/or wires sending signals indicative of volume to the controller 128 from the flow sensor 110. Alternatively or in addition, the flow sensor 110 may transmit a wireless signal to the controller 128 indicative of flow volume. It is to be understood that the controller 128 may comprise a processor connected to computer readable memory storing computer executable instructions to execute the control functions and calculation functions described herein, but also may comprise a logic device sufficient to perform the necessary control functions and calculation functions described herein. A programmable logic controller (PLC) is one non-limiting example of such a logic device.

The controller 128 is also connected to and controls the vent valve 122 to vent the supply line 113 at the end of each lubrication cycle. The controller 128 is configured to calculate the amount of lubricant dispensed to the lubrication points 119 by calculating a net flow measurement after each lubrication cycle. The controller 128 is capable of determining the net flow measurement in the depicted net lubrication flow detector system 107 by monitoring the flow valve 122 during a lubrication cycle. It is also contemplated that a lubrication cycle can be time based only (e.g., pumping lubricant for a preset period of time); alternatively, a lubrication cycle can be based upon a signal from an external source that functions to begin and end the pumping of lubricant.

Still referring to FIG. 1, the controller 128 is capable of determining the amount dispensed to the lubrication points 119 by being configured to first operate the pump 125 to transfer lubricant to the lubrication points 119 via the supply line 113. The controller 128 opens an air solenoid valve 131 to supply air pressure to the pump 125. The system 107 further comprises input means 130 where air is provided and controlled by the air solenoid valve 131. The pump 125 then pumps lubricant into the closed system comprising the supply line 113, thereby building up pressure in the closed system. One or more grease dispensing injectors 134 are further included in the system and are connected to the supply line 113 for dispensing lubricant to the lubrication points 119 when actuated by a predetermined pressure. The injectors 134 operate to dispense a predetermined amount of lubricant to lubrication points 119. A pressure switch 149 further included in the system 107 monitors pressure in the supply line 113 to determine when the pressure reaches the predetermined amount of pressure.

The pressure switch 149 is responsive to lubricant pressure in the supply line 113, and closes at a predetermined pressure measurement to send a signal to the controller 128. In an embodiment, the controller 128 is further configured to operate the pump 125 until the predetermined pressure measurement within the supply line 113 to actuate the injectors 134 is sensed by the pressure switch 149. The pressure switch 149 is configured to provide an indication to the controller 128 that the injectors have actuated so that the lubricant flow direction in the supply line 113 will reverse when the vent valve 122 is actuated. The controller 128 is configured to shut the air off to the pump 125 resulting in shutting down the pressurized supply of lubricant for that cycle. The controller 128 is further configured to open the vent valve 122 to release the pressurized lubricant accumulated in the supply line 113 after the injectors 134 actuate. As a result of releasing the accumulated pressurized lubricant, the lubricant from the supply line 113 is directed to the lubricant supply 116 via the return line 137.

The controller 128 in configured to provide a failure detection determination as to whether a sufficient amount of lubricant by volume has been dispensed to lubrication points 119 by being further configured to compare a determined amount of dispensed lubricant to a reference amount. The reference amount of lubricant by volume is derived from operating the system to obtain a reference amount of lubricant by volume at a time when all relevant system components are confirmed to be working properly. For example, the sufficient amount of lubricant by volume is defined as the total lubricant dispensed by the injectors for each cycle within a tolerance of −1% for deficient flow dispensing and +5% for excessive flow dispensing. In other words, an indication of deficient flow would be provided when the total lubricant dispensed by the injectors is at least 1% less than the reference amount and an indication of excessive flow would be provided when the total lubricant dispensed by the injectors is at least 5% more than the reference amount. as demonstrated in the following non-limiting example.

As one non-limiting example of calculating a reference amount, lubricant is supplied to twelve lubrication points 119 in the flow detector system 107. The lubrication points 119 are known to each require one cubic centimeter of lubricant by volume. A total of fourteen cubic centimeters of lubricant by volume as measured by the flow sensor 110 is pumped into the supply line 113 of the system during each cycle before venting. After venting, a total of two cubic centimeters of lubricant by volume as measured by the flow sensor 110 is vented into the supply 116. As a result, since a total of twelve cubic centimeters of lubricant by volume is required by the twelve lubrication points 119, the reference amount of lubricant is the net flow calculation of twelve cubic centimeters. The reference amount of lubricant by volume allows for a comparison with a determined amount by taking certain factors into account such as the compression and expansion of the supply line 113 and the lubricant. If before venting the flow sensor 110 detects thirteen cubic centimeters dispensed to the lubrication points 119 and if after venting the flow sensor 110 detects two cubic centimeters vented to the supply 116, the controller determines that eleven cubic centimeters has been dispensed in one cycle. Since only eleven and not twelve cubic centimeters was dispensed to the lubrication points, this would be a deficient flow because the total lubricant delivered of eleven centimeters is at least 1% less than twelve cubic centimeters (i.e., eleven centimeters is at least 0.12 cubic centimeters less than twelve centimeters). If before venting the flow sensor 110 detects fifteen cubic centimeters dispensed to the lubrication points 119 and if after venting the flow sensor 110 detects two cubic centimeters vented to the supply 116, the controller determines that thirteen cubic centimeters has been dispensed in one cycle. Since thirteen and not twelve cubic centimeters was dispensed to the lubrication points, this would be an excessive flow because the total lubricant delivered of thirteen centimeters is at least 5% more than twelve cubic centimeters (i.e., thirteen centimeters is at least 0.6 cubic centimeters more than twelve centimeters).

Thus, the controller 128 is configured to indicate whether deficient flow is present in the system 107 by providing an indication of deficient flow when the determined amount is at least 1% less than the reference amount, as previously described. For example, deficient flow may be due to a blockage in the system 107 and/or a malfunctioning injector. In addition, the controller 128 is configured to indicate whether excessive flow is present in the system 107 by providing an indication of excessive flow when the determined amount is at least 5% more than the reference amount. For example, excessive flow may be due to a leak in supply line 113, or elsewhere in the system 107.

It is contemplated that additional or alternative components are used by the net lubrication flow detector system 107. For example, the net lubrication flow detector system 107 including pump 125 may comprise a hydraulically operated pump, in which case the pump operates by creating a vacuum at the inlet of the pump 125 using the air solenoid valve 131 as previously described. The vacuum creates a pressure difference forcing lubricant from the lubricant supply 116 to the supply line 113, allowing components of the net lubrication flow detector system 107 to operate according to the principles previously described.

Figure 2:
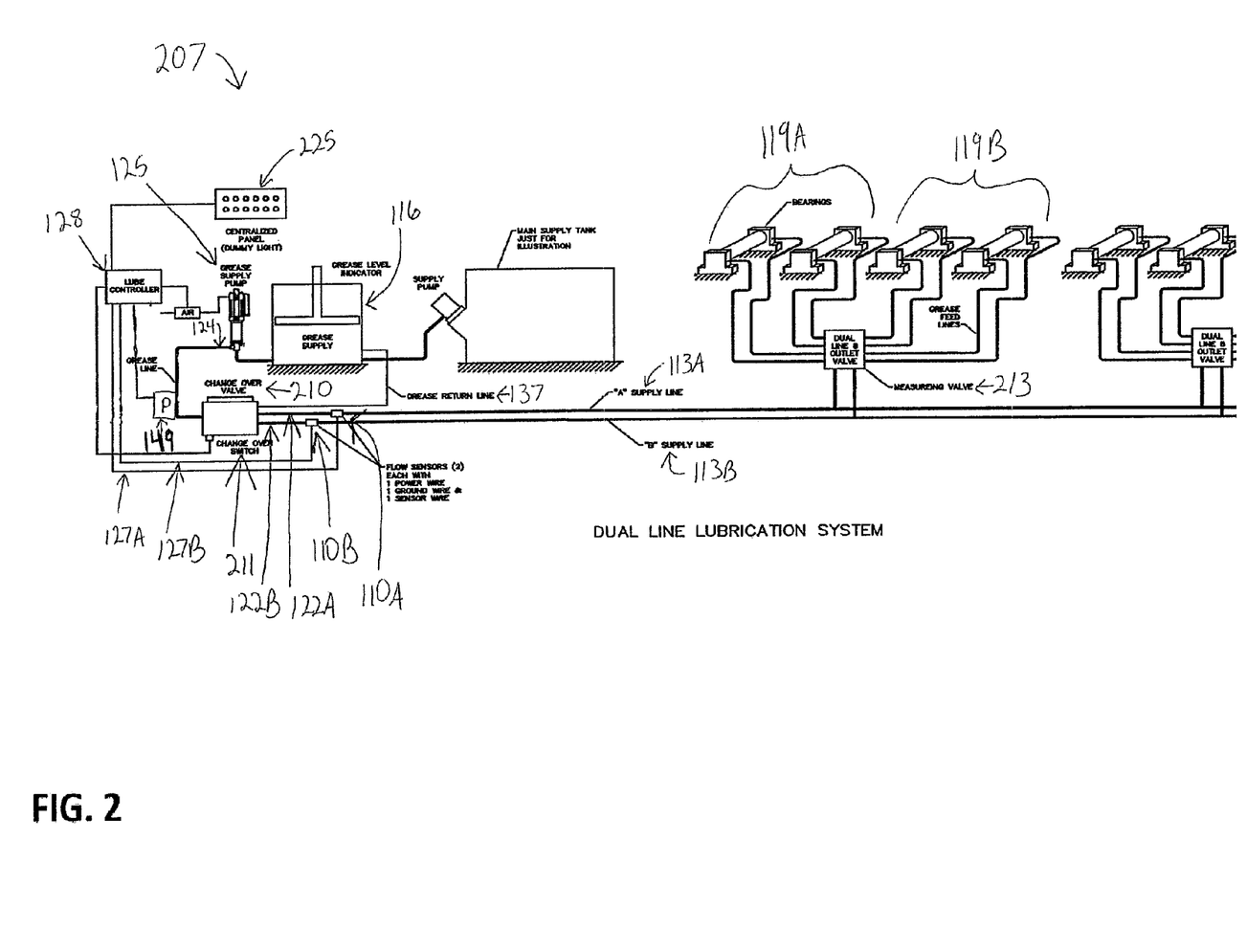
FIG. 2 depicts a perspective view of a net lubrication flow detector system and method for use in a dual line lubrication system for determining lubrication flow dispensed to lubrication points in accordance with a second construction of the present invention.

FIG. 2 depicts a perspective view of a net lubrication flow detector system 207 for use in a dual line automatic lubrication system for determining lubrication flow dispensed to lubrication points in accordance with a second construction of the present invention. The net lubrication flow detector system 207 includes controller 128 that is configured to determine the amount of lubricant dispensed to lubrication points 119A and to second lubrication points 119B by calculating net flow measurements to each of lubrication points 119A and second lubrication points 119B separately. The controller 128 is capable of determining the net flow measurement in the depicted pressure activated net lubrication flow detector system 207 by initiating a lubrication cycle. In an embodiment, a centralized panel 225 with a dummy light is connected to the controller 128 and is configured to provide indications as will be described herein.

The net lubrication flow detector system 207 includes flow sensing components comprising a flow sensor 110A configured to detect the flow of lubricant supply within a supply line 113A, and a second flow sensor 110B configured to measure the flow of lubricant within s second supply line 113B. Flow sensor 110A is connected to controller 128 via connecting wires 127A such as wires transmitting power, wires connected to ground, and wires sending signals to the controller 128 from the flow sensor 110A. Similarly, flow sensor 110B is connected to controller 128 via connecting wires 127B. The net lubrication flow detector system 207 further includes a measuring valve 213 connected to supply lines 113A, 114A. The valve 213 is configured to dispense a predetermined amount of lubricant during each lubrication cycle. In an embodiment, the lubrication points 119A, 119B comprise bearings.

With further reference to FIG. 2, a change over valve 210 is included, and operates to connect the pump 125 to the supply line 113A and to the second supply line 113B to first transfer the lubricant from the lubricant supply 116 to the supply line 113A. The change over valve 210 is configured to be pressure activated to transfer the lubrication to second supply line 113B. The change over valve 210 changes the direction of lubricant to second supply line 113B when a predetermined pressure within the supply line 113A is reached. The pressure in the supply line 113A activates the change over valve 210 after the predetermined pressure is reached in the supply line 113A. The change over valve 210 is adjustable to an appropriate pressure and transfers lubricant to either supply line 113A or second supply line 113B. Thus, the change over valve 210 operates to transfer the lubricant from the lubricant supply 116 to both the first and second supply lines 113A, 113B.

A change over switch 211 provides an indication to the controller 128 when the change over valve 210 is actuated by the predetermined pressure indicating that the valve 210 has switched the pressurized lubricant supply from line 113A to line 113B or from supply line 113B to line 113A.

In one embodiment, the change over valve 210 vents line 113A while supplying lubricant to line 113B thereby venting the pressurized lubricant in line 113A back to the supply 116 via the grease return line 137 that is connected to the change over valve 210. In addition, the change over valve 210 vents line 113B when the pressure is reduced and the change over valve 210 switches to transfer lubricant from line 113B back to line 113A thereby venting the pressurized lubricant in line 113B back to the supply 116 via the grease return line 137 that is connected to the change over valve 210.

Alternatively or in addition, optional vent valves connected to the supply 116 can be located in lines 113A, 113B as indicated by arrows 122A, 122B between the lubricant supply 116 and lubrication points 119A, 119B. The optional vent valve at 122A is opened by the controller 128 after the controller receives a signal from the change over switch 211 indicating that the change over valve 210 has switched to supplying lubricant to line 113B. The optional vent valve at 122A is closed by the controller 128 and the optional vent valve at 122B is opened by the controller 128 after the controller 128 receives a signal from the change over switch 211 indicating that the change over valve 210 has switched to supplying lubricant back to line 113A. The optional vent valve at 122B is closed by the controller 128 after the lubrication cycle is completed, such as by an indication from pressure switch 149 that the pressure in the grease line 124 has returned to ambient.

An indication provided to the controller 128 by the change over switch 211 that the change over valve 210 has switched from line 113A to 113B is an indication that line 113A is venting and that the flow direction in line 113A has reversed. An indication provided to the controller 128 by the change over switch 211 that the change over valve 210 has switched from line 113B to 113A is an indication that line 113B is venting and that the flow direction in line 113B has reversed. A pressure switch 149 is configured to provide an indication to the controller 128 that a predetermined pressure has been reached.

The controller 128 is configured to determine the amount of lubricant dispensed to the lubrication points 119A based upon the difference between a first lubricant flow measurement and a second lubricant flow measurement. The flow sensor 110A detects the first lubricant flow measurement while the change over valve 210 dispenses the lubricant from the lubricant supply 116 to supply line 113A, and the flow sensor 110A provides the first detected lubricant flow measurement to the controller 128. The change over valve 210 switches from line 113A to line 113B when the predetermined pressure has been reached. The change over valve 210 then dispenses the lubricant to supply line 113B and vents supply line 113A. The flow sensor 110A detects the second lubricant flow measurement as controller 128 vents supply line 113A, and the flow sensor 110A provides the second detected lubricant flow measurement to the controller 128.

The controller 128 is configured to determine the amount of lubricant dispensed to first lubrication points 119A based upon the difference between the first lubricant flow measurement and the second lubricant flow measurement as compared to a reference amount.

The controller 128 is configured to determine the amount of lubricant dispensed to the lubrication points 119B based upon the difference between a third lubricant flow measurement and a fourth lubricant flow measurement. The flow sensor 110B detects the third lubricant flow measurement while the change over valve 210 dispenses the lubricant to supply line 113B and the flow sensor 110B provides the third detected lubricant flow measurement to the controller 128. The flow sensor 110A detects the second lubricant flow measurement while the flow sensor 110B detects the third lubricant flow measurement. The change over valve 210 switches from line 113B to line 113A when the predetermined pressure has been reached to actuate the injectors and then the pressure is released so that the change over valve reverts to supply line 113A and vents line 113B. The flow sensor 110B detects the fourth lubricant flow measurement while the change over valve 210 vents supply line 113B and the flow sensor 110B provides the detected fourth lubricant flow measurement to the controller 128.

The controller 128 is configured to determine the amount of lubricant dispensed to second lubrication points 119B based upon the difference between the third lubricant flow measurement and the fourth lubricant flow measurement as compared to a reference amount.

In an alternative embodiment, the change over valve 210 is electrically activated by the controller 128, and uses the pressure switch 149 to sense pressure in the grease line 124. The electrically activated change over valve 210 further comprises a solenoid that activates to selectively direct the flow of lubricant to the first or second supply lines 113A, 113B. The controller 128 controls the operation of the solenoid based upon signals received by the pressure switch 149 that enable the providing of an indication to the controller 128 that a predetermined pressure measurement in the supply lines 113A, 133B has been reached so that the measuring valve 213 has been actuated to dispense lubricant to points 119A, 119B, respectively.

The controller 128 is configured to calculate a reference amount of lubricant dispensed by volume according to the non-limiting example as described above. The controller 128 is further configured to compare the determined amount of dispensed lubricant by volume to a reference amount. As described above, the determined amount is calculated based upon the difference between the first lubricant flow measurement detected by flow sensor 110A as lubricant is dispensed by change over valve 210 to flow out to supply line 113A, and the second lubricant flow measurement detected by flow sensor 110A as the lubricant returns to the lubricant supply 116 while the supply line 113A is vented. In an embodiment, an indication of excessive flow is provided according to the example described above when the determined amount based upon the difference between the first lubricant flow measurement and the second lubricant flow measurement is greater than the reference amount. An indication of deficient flow is provided according to the example described above when the determined amount based upon the difference between the first lubricant flow measurement and the second lubricant flow measurement is less than the reference amount.

The controller 128 is further configured to compare a determined second amount of dispensed lubricant to a second reference amount. The controller 128 is configured to calculate a second reference amount of dispensed lubricant in a similar manner as described above with reference to FIG. 1. The determined second amount is calculated based upon the difference between the third lubricant flow measurement detected by flow sensor 110B as change over valve 210 dispenses lubricant flow to second supply line 113B, and the fourth lubricant flow measurement detected by flow sensor 110B as the lubricant returns to the lubricant supply 116 while the second supply line 113B is vented. An indication of excessive flow is provided according to the example described above when the determined second amount based upon the difference between the third lubricant flow measurement and the fourth lubricant flow measurement is greater than the second reference amount. An indication of deficient flow is provided according to the example described above when the determined second amount based upon the difference between the third lubricant flow measurement and the fourth lubricant flow measurement is less than the second reference amount.

A centralized panel 225 with dummy light is configured to provide indications from the controller 128. The indications provided by the centralized panel 225 comprise the indications related to excessive and deficient flow as described above.

Figure 3:
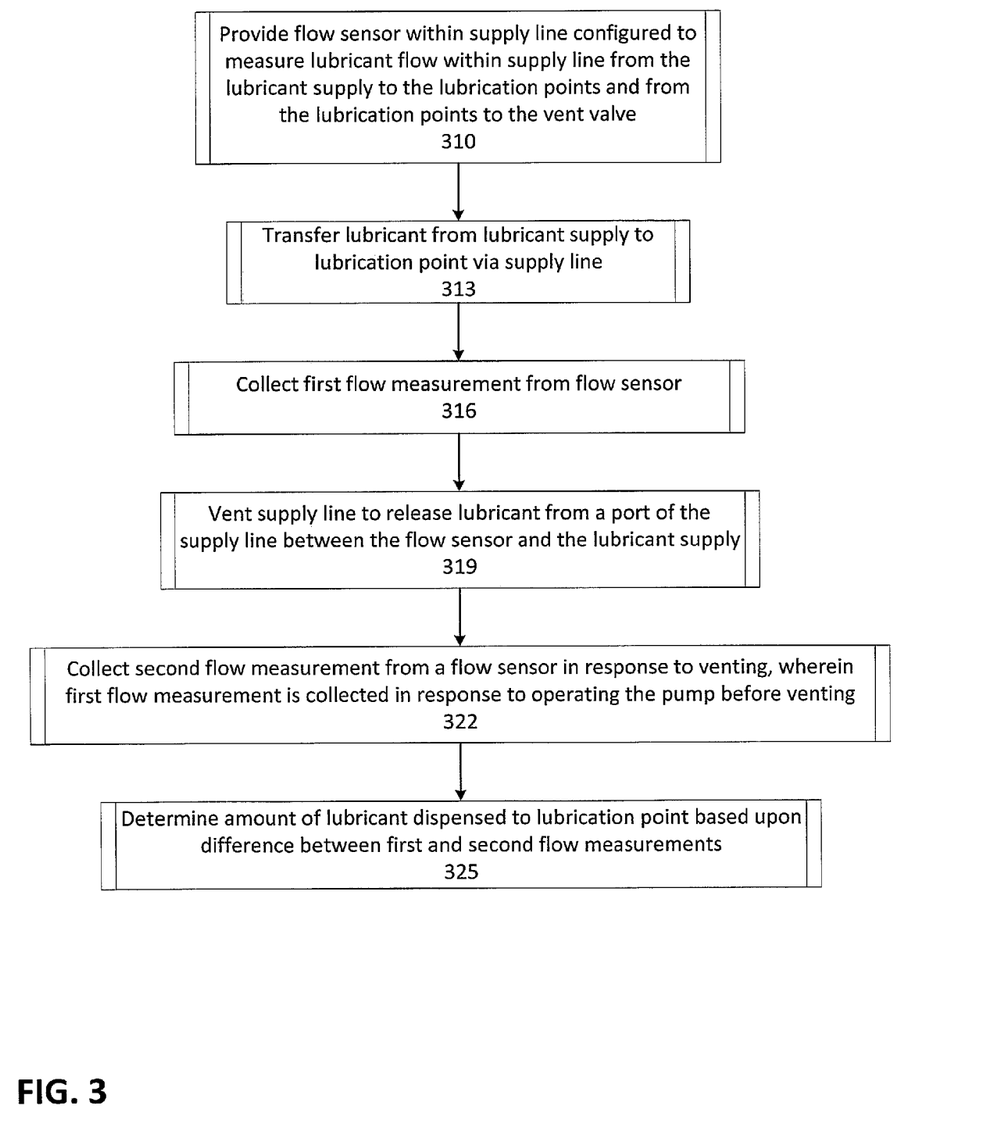
FIG. 3 is a flow chart depicting a method of operating a control system to confirm lubrication to lubrication points in accordance with another embodiment of the present invention.

FIG. 3 is a flow chart depicting a method of operating a control system to confirm lubrication to lubrication points 119 in accordance with another embodiment of the present invention. At step 310, a flow sensor 110 within a supply line 113 is provided that is configured to measure lubricant flow within the supply line 113 from the lubricant supply 116 to the lubrication points 119 and, in addition, the flow sensor 110 is configured to measure lubricant flow within the supply line 113 from the lubrication points 119 to the vent valve 122. The lubricant flow from the lubrication points 119 to the vent valve 122 is flow in the reverse direction as compared to flow within the supply line 113 from the lubricant supply 116 to the lubrication points 119. At step 313, lubricant is dispensed from the lubricant supply 116 to the lubrication points 119 via supply line 113. The process continues at 316, where a first flow measurement of the volume of lubricant flowing is detected from flow sensor 110 during the transfer at step 313. The flow measurement is completed after the controller 128 receives an indication that a predetermined pressure has been reached, as previously described above.

With further reference to FIG. 3, step 319 comprises venting the supply line 113 such as by vent valve 122 to release lubricant from the supply line 113. At step 322, a second flow measurement is detected from flow sensor 110 in response to venting the supply line 113 using the vent valve 122. The process depicted in FIG. 3 concludes at 325, where the amount of lubricant dispensed to the lubrication points 119 is determined such as by a controller 128 based upon the difference between the first and second flow measurements. The determined amount of lubricant dispensed to the lubrication points 119 is compared to a reference amount, to provide an indication as to excessive or deficient lubrication flow by volume, as previously described herein.

It is further contemplated that the process depicted in FIG. 3 further comprises a net lubrication flow detector system 207 for a dual line automatic lubrication system as depicted in FIG. 2, capable of determining an amount of lubricant dispensed by volume to lubrication points 119A and capable of determining a second amount of lubricant dispensed by volume to second lubrication points 119B as previously described above. With reference to step 310 of FIG. 3, a flow sensor 110A within a supply line 113A is provided that is configured to measure lubricant flow within the supply line 113A from the lubricant supply 116 to the lubrication points 119A and, in addition, the flow sensor 110A is configured to measure lubricant flow vented from the supply line 113A. The vented lubricant flow from the lubrication points 119A is flow in the reverse direction as compared to flow within the supply line 113A from the lubricant supply 116 to the lubrication points 119A. At step 313, lubricant is transferred from the lubricant supply 116 to the lubrication points 119A via supply line 113A and via measuring valve 213 which dispenses a preset amount of lubricant to points 119A. The process continues at 316, where a first flow measurement of the volume of lubricant flowing is detected from flow sensor 110A during the transfer at step 313. The flow measurement is completed after the predetermined pressure has been reached, as previously described above.

With further reference to FIG. 3, step 319 comprises venting the supply line 113A to release lubricant from the supply line 113A. Additionally or alternatively, optional vent valve 122A or change over valve 210 is used to release the lubricant from supply line 113A. At step 322, a second flow measurement is detected from flow sensor 110A in response to venting the supply line 113A. At step 325, the amount of lubricant dispensed to the lubrication points 119A is determined based upon the difference between the first and second flow measurements. The determined amount of lubricant dispensed to the lubrication points 119A is compared to a reference amount provide an indication as to excessive or deficient lubrication flow by volume, as previously described herein.

FIG. 3 further depicts determining an amount of lubricant dispensed by volume to lubrication points 119B as previously described above. The change over valve 210 is configured to operate as described above to dispense lubricant flow to the second supply line 113B after dispensing lubricant to the supply line 113A and configured to dispense the lubricant from the lubricant supply 116 to the second supply line 113B after the predetermined pressure is reached in the supply line 113A. It is contemplated that a second flow sensor 110B is provided at 310 to sense flow from the lubricant supply 116 to the second lubrication points 119B and to sense lubricant vented from supply line 113B.

In an embodiment, an optional second vent valve 122B is located between lubricant supply 116 and second flow sensor 110B and the optional second vent valve 122B is used to release the lubricant from supply line 113B. Additionally or alternatively, change over valve 210 is used to release the lubricant from supply line 113B. With reference to step 310 of FIG. 3, the second flow sensor 110B within a supply line 113B is provided that is configured to measure lubricant flow within the supply line 113B from the lubricant supply 116 to the lubrication points 119B and, in addition, the flow sensor 110B is configured to measure lubricant flow vented from the supply line 113A. The vented lubricant flow from the lubrication points 119B is flow in the reverse direction as compared to flow within the supply line 113B from the lubricant supply 116 to the lubrication points 119B. At step 313, lubricant is transferred from the lubricant supply 116 to the lubrication points 119B via supply line 113B and via measuring valve 213 which dispenses a preset amount of lubricant to points 119B. The process continues at 316, where a third flow measurement of the volume of lubricant flowing is detected from flow sensor 110B during the transfer at step 313. The flow measurement is completed after the predetermined pressure has been reached, as previously described above.

With further reference to FIG. 3, step 319 comprises venting the supply line 113B to release lubricant from the supply line 113B. Additionally or alternatively, optional vent valve 122B or change over valve 210 is used to release the lubricant from supply line 113B. At step 322, a fourth flow measurement is detected from flow sensor 110B in response to venting the supply line 113B. At step 325, the amount of lubricant dispensed to the lubrication points 119B is determined based upon the difference between the third and fourth flow measurements. The determined amount of lubricant dispensed to the lubrication points 119B is compared to a reference amount provide an indication as to excessive or deficient lubrication flow by volume, as previously described herein. Alternatively or in addition, flow sensors can be located in the grease line 124 and the grease return line 137.

Figure 4:
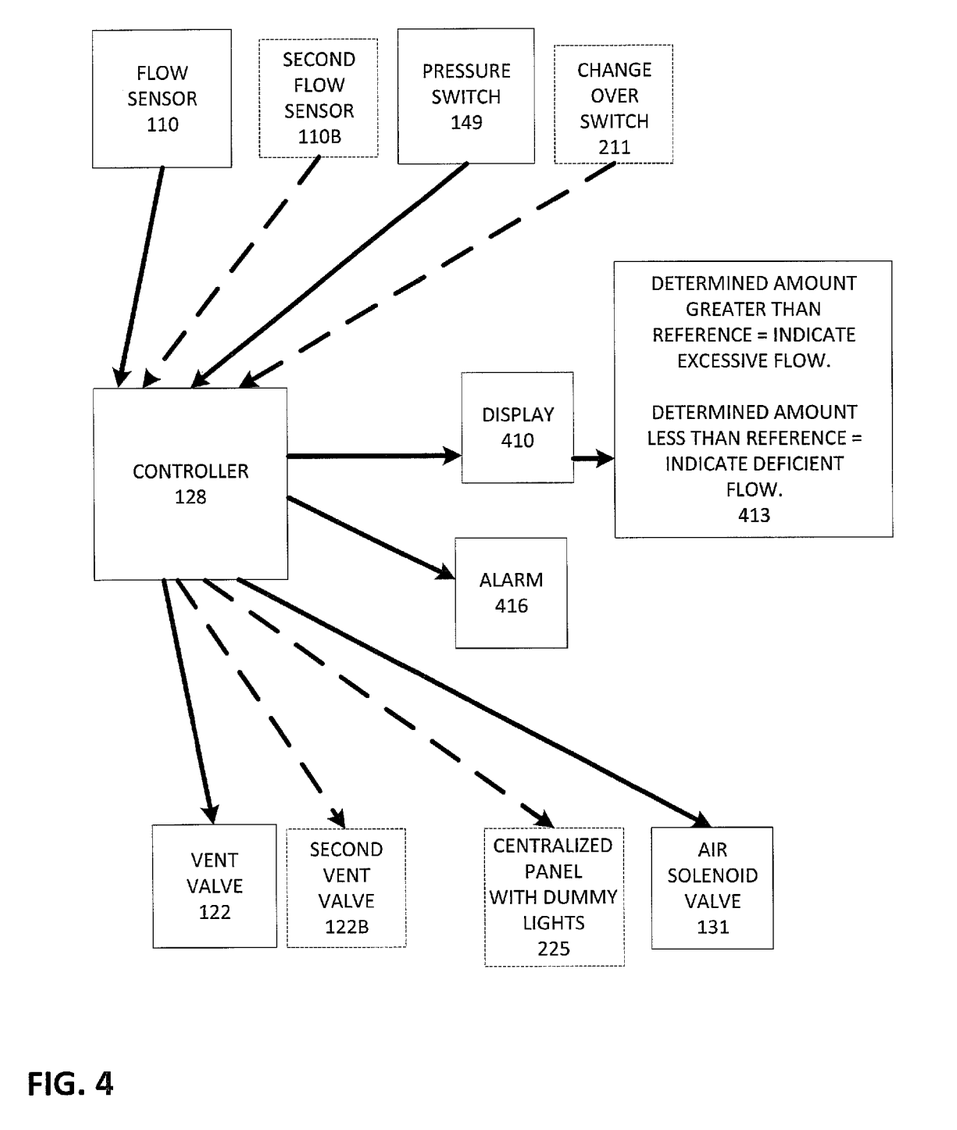
FIG. 4 is a block diagram depicting the structural elements of the systems of FIGS. 1 and 2 with regard to the functional aspects of the control system inputs and outputs in accordance with the first construction and the second construction of the present invention.

FIG. 4 is a block diagram depicting the structural elements of the systems of FIGS. 1 and 2 with regard to the functional aspects of the control system inputs and outputs in accordance with the first construction and the second construction of the present invention, with aspects of the second construction of the present invention indicated in phantom. Regarding aspects of the first construction of the present invention, controller 128 receives inputs from flow sensor 110 that are used to measure the volume of lubricant dispensed to the lubrication points 119 during a lubrication cycle as described above and to measure the amount of lubricant vented by the vent valve 122 at the end of a lubrication cycle. Controller 128 also receives inputs from pressure switch 149 to provide an indication as to whether the predetermined pressure for actuating the injectors has been reached.

With regard to the functional aspects of the control system inputs in accordance with the second construction of the present invention, it is to be understood that flow sensor 110A, second lubrication points 119A, and vent valve 122A are contemplated as functioning in a similar manner as flow sensor 110, second lubrication points 119, and vent valve 122, respectively. Also, the controller 128 receives inputs from the second flow sensor 110B that are used to determine the volume of lubricant dispensed to the second lubrication points 119B during a lubrication cycle as described above. Additionally, the controller 128 receives inputs from the second flow sensor 110B that are used to determine the amount of lubricant vented by the optional second vent valve 122B at the end of a lubrication cycle. Additionally or alternatively, the change over valve 210 vents the lubricant at the end of a lubrication cycle. Additionally, the controller 128 receives inputs from the change over switch 211 in the second construction of the present invention, as noted above.

Controller 128 is also configured to generate outputs regarding aspects of the first construction of the present invention comprising an output to the air solenoid valve 131 to supply air pressure to the pump 125 to provide lubricant to the supply line 113A and to the second supply line 113B, and an output to the optional vent valve 122A to release the pressure in the supply line 113A by directing the pressurized lubricant from the supply line 113A back to the lubricant supply 116. With further reference to FIG. 4 and outputs related to the second construction of the present invention, it is to be understood that controller 128 also generates outputs comprising an output to an optional second vent valve 122B to release the pressure in the second supply line 113B by directing the pressurized lubricant from the second supply line 113B back to the lubricant supply 116.

In one embodiment, controller 128 generates an output to a display 410 that comprises an indication as described by 413, e.g., an indication of excessive flow when the determined amount is greater than the reference amount and/or an indication of deficient flow if the determined amount is less than the reference amount, as described above. The display 410 can be a display screen on a monitor or other type of display device. Alternatively or in addition, an output by the controller 128 to an audible and/or visible alarm 416 provides a notification. The alarm can be a notification sent via email, text message, or to a phone number. Also, controller 128 can generate outputs to a centralized panel 225 with dummy light as described above.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium which is not a signal. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results may be attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A method for determining a net volume of lubrication flow dispensed to a lubrication point, the method comprising:
   providing a flow sensor within a supply line supplying lubricant from a lubricant supply to the lubrication point, the flow sensor configured to measure a volume measurement of lubricant flow within the supply line;
   transferring lubricant from the lubricant supply to the lubrication point via the supply line;
   collecting a first volume measurement of lubricant flow from the flow sensor during the transferring;
   venting the supply line to release lubricant from a port of the supply line between the flow sensor and the lubricant supply;
   collecting a second volume measurement of lubricant flow from the flow sensor during the venting of the supply line; and
   determining the net volume of lubricant dispensed to the lubrication point based upon a difference between the first volume measurement and the second volume measurement.

2. The method of claim 1, further comprising
   providing a pump configured to transfer the lubricant from the lubricant supply to the supply line;
   providing a pressure switch between the lubricant supply and the supply line, the pressure switch configured to detect a pressure measurement of the lubricant in the supply line;
   providing a vent valve between the lubricant supply and the supply line; and
   providing an injector connected to the supply line to dispense lubricant to a lubrication point when actuated by a predetermined pressure; and
   operating the pump until the predetermined pressure measurement within the supply line is sensed by the pressure switch and the injector has been actuated, wherein said venting further comprises operating the vent valve to release the supply line pressure after the predetermined pressure measurement to direct the lubricant from the supply line to the lubricant supply.

3. The method of claim 1, further comprising:
   comparing the net volume of lubricant dispensed to a reference volume;
   providing an indication of excessive flow when the comparing indicates that the determined net volume is greater than the reference volume; and
   providing an indication of deficient flow when the comparing indicates that the determined net volume is less than the reference volume.

4. The method of claim 1, further comprising:
   providing a second flow sensor within a second supply line supplying lubricant from the lubricant supply to a second lubrication point, the second flow sensor configured to measure a volume measurement of lubricant flow within the second supply line;
   providing a change over valve configured to transfer lubricant from the lubricant supply to the second supply line after supplying lubricant to the first supply line and configured to transfer the lubricant from the lubricant supply to the second supply line after the predetermined pressure is reached in the first supply line;
   transferring lubricant from the lubricant supply to the second lubrication point via the second supply line via the change over valve;
   collecting a third volume measurement of lubricant flow from the second flow sensor during the transferring lubricant to the second lubrication point;
   venting the second supply line to release lubricant from a port of the second supply line between the second flow sensor and the lubricant supply;
   collecting a fourth volume measurement of lubricant flow from the second flow sensor during the venting of the second supply line; and
   determining a second net volume of lubricant dispensed to the second lubrication point based upon a difference between the third volume measurement and the fourth volume measurement.

5. The method of claim 4, further comprising:
   comparing the determined net volume of lubricant dispensed to a reference volume;
   providing an indication of excessive flow when the comparing indicates that the determined net volume is greater than the reference volume; and
   providing an indication of deficient flow when the comparing indicates that the determined net volume is less than the reference volume;
   additionally comparing the determined second net volume lubricant dispensed to a second reference volume;

providing an indication of excessive flow when the additional comparing indicates that the determined second net volume is greater than the reference volume; and
providing an indication of deficient flow when the additional comparing indicates that the determined second determined net volume is less than the reference volume.

6. A system for determining lubrication flow dispensed to a lubrication point, the system comprising:
a flow sensor within a supply line supplying lubricant from a lubricant supply to the lubrication point, the flow sensor configured to measure a volume measurement of lubricant flow within the supply line;
a vent valve in the supply line between the lubricant supply and the flow sensor; and,
a controller connected to the flow sensor and the vent valve, the controller configured to:
collect a first volume measurement of lubricant flow from the flow sensor during transfer of lubricant from the lubricant supply to the lubrication point;
open the vent valve to vent lubricant from the supply line after the transfer of lubricant to the lubrication point;
collect a second volume measurement of lubricant flow from the flow sensor in response to venting by the vent valve; and
determine the net volume of lubricant dispensed to the lubrication point based upon difference between the first volume measurement and the second volume measurement.

7. The system of claim 6, further comprising
a pump configured to transfer the lubricant from the lubricant supply to the supply line;
a pressure switch configured to detect a pressure measurement of the lubricant in the supply line; and
an injector connected to the supply line for dispensing lubricant to the lubrication point when actuated by a predetermined pressure;
wherein the controller is connected to the pressure switch, the controller further configured to operate the pump to transfer lubricant from the lubricant supply to the lubrication point via the supply line until the predetermined pressure measurement within the supply line is sensed by the pressure switch and the injector has been actuated.

8. The system of claim 7, wherein the controller is further configured to:
compare the net volume of lubricant dispensed to a reference volume;
provide an indication of excessive flow when the comparing indicates that the determined net volume is greater than the reference volume; and
provide an indication of deficient flow when the comparing indicates that the determined net volume is less than the reference volume.

9. The system of claim 6, further comprising:
a second flow sensor within a second supply line supplying lubricant from the lubricant supply to a second lubrication point, the second flow sensor configured to measure a volume measurement of lubricant flow within the second supply line; and,
wherein the vent valve comprises a change over valve configured to transfer the lubricant from the lubricant supply to the second supply line after supplying lubricant to the first supply line and configured to transfer the lubricant from the lubricant supply to the second supply line after the predetermined pressure is reached in the first supply line;
wherein the controller is connected to the second flow sensor and the changeover valve, the controller further configured to:
operate the pump to transfer lubricant to the second lubrication point via the second supply via the changeover valve;
collect a third volume measurement of lubricant flow from the second flow sensor during the transfer of lubricant to the second lubrication point;
open the vent valve to vent the second supply line to release lubricant from a port of the second supply line between the second flow sensor and the lubricant supply to release the second supply line pressure to direct the lubricant from the second supply line to the lubricant supply;
detect from the second flow sensor a fourth volume measurement lubricant flow in response to venting the second supply line; and
determine a second net volume of lubricant dispensed to the second lubrication point based upon a difference between the third volume measurement and the fourth volume measurement.

10. The system of claim 9, wherein the controller is further configured to:
compare the determined net volume of lubricant dispensed to a reference volume;
provide an indication of excessive flow when the comparing indicates that the determined net volume is greater than the reference volume; and
provide an indication of deficient flow when the comparing indicates that the determined net volume is less than the reference volume;
additionally compare the determined second net volume lubricant dispensed to a second reference volume;
provide an indication of excessive flow when the additional comparing indicates that the determined second net volume is greater than the reference volume; and
provide an indication of deficient flow when the additional comparing indicates that the determined second determined net volume is less than the reference volume.

* * * * *